United States Patent Office 3,284,467
Patented Nov. 8, 1966

3,284,467
POLYCHLOROETHYLMERCAPTOMETHANE - SULFENYL CHLORIDES, POLYHALO - 1,3 - DITHIOLANES AND THEIR PREPARATION
Harold M. Pitt, Lafayette, and Harry Bender, El Cerrito, Calif., assignors to Stauffer Chemical Company, New York, N.Y., a corporation of Delaware
No Drawing. Filed Nov. 6, 1963, Ser. No. 321,664
11 Claims. (Cl. 260—327)

This invention relates to a new and novel method for preparing organic sulfur containing compounds. In particular, it refers to the new and novel classes of organic sulfur containing compounds and more specifically chloroalkylthiodichloromethane sulfenyl chlorides, bis(chloroalkylthio) dichloromethane, substituted 1,3-dithiolanes, and the like. It also refers to the preparation of said sulfur containing compounds by the reaction of carbon disulfide with chlorine and certain alkenes and alkynes.

It is an object of the present invention to prepare organic sulfur containing compounds, some of which are new, by a process which comprises the reaction of carbon disulfide, chlorine, and certain alkenes and alkynes in the presence of actinic light. A catalyst may be used but is not deemed necessary to fulfill the objectives of the present invention.

The preferred organic intermediates, according to the present process are alkenes and alkynes. By alkenes and alkynes it is implied that any organic compound containing unsaturation, either double bond or triple bond, may be used in the practice of the present invention. The organic compound starting material may also be substituted with a halogen; chlorine is the preferred substituent.

The present invention provides a new class of compounds represented by the following generic formula (1)  

wherein X is halogen and R is selected from the group consisting of haloalkyl and arylhaloalkyl.

Likewise, the present invention provides a method for preparing compounds represented by the following generic formula (2)  

wherein X is halogen, R and R' are selected from the group consisting of haloalkyl and arylhaloalkyl.

The present invention provides a method for preparing compounds represented by the following generic formula (3)  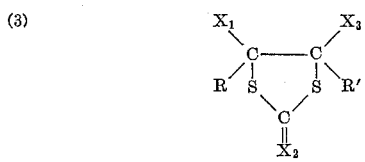

wherein $X_1$, $X_2$ and $X_3$ are halogen, R and R' are selected from the group consisting of hydrogen and lower alkyl.

A common characteristic of the compounds, as shown in the above Formulas 1, 2 and 3, is the presence of two divalent sulfur atoms in which at least one valence of each sulfur is bonded to a common divalent methylene carbon atom containing halogens.

Other halogens can be used in place of chlorine gas, but the characteristics of reaction and ease of mechanical manipulation in the reactor makes chlorine the preferred reactant. The halogen may be introduced into the solution at any rate, but it is to be noted that the rate of addition has an effect upon the temperature of the reaction and consequently on the yield of desired products.

The temperature at which the reaction is carried out may vary greatly; however, it is naturally limited by the boiling ranges of the reactant mixtures. Reactions may be carried out at atmospheric pressure or at reduced or increased pressure. The reactants may be stirred or agitated if desirable. Since many of these compounds are thermally unstable, it is preferred to conduct the reactions at temperatures below 40–45° C.

The process of the present invention can be carried out by the reaction of carbon disulfide, chlorine and an alkene or alkyne in the presence of an initiator for free-radical reactions. The choice of initiator is one of convenience. Suitable initiators are actinic radiation such as ultraviolet light, organic peroxides or hydroperoxides, or an aliphatic azo compound or the like. The preferred initiator is any type of actinic light, such as furnished by daylight or by an artificial source such as an electric bulb, mercury vapor lamp, a fluorescent light or the like.

Other catalysts can be employed, if desired, although the use of such catalysts is not essential or a critical feature.

The reaction may be carried out in the presence of a solvent or in the absence of solvents. The solvent selected should be inert. However, in the preferred form of the invention no solvent is used; carbon disulfide is its own solvent. Since the reaction is dependent on the frequency of collision of the free radicals present in solution, it is preferred to use no solvent, but instead an excess of carbon disulfide.

All the reactants employed in the reaction are of commercial grade and they do not require special purification prior to use.

The reaction was conducted by relatively simple and conventional methods. In the simplest mode of operation the reactor was charged with carbon disulfide. Dry chlorine gas was admitted through a distributor near the bottom of the reactor. The alkene or alkyne, if a gas, was introduced simultaneously with the chlorine into the carbon disulfide filled reactor. The reactor can be a vertical tube design so as to allow maximum contact time of gases and carbon disulfide during irradiation or a flask with a means for agitating the mixture.

A source of actinic light was furnished by a series of fluorescent "black lights" arranged around the tubular reactor or by U. V. sun lamps on the reaction flask. The reaction was kept below 40° C. by a cooling finger, immersion in a cooling tank, or other convenient method for removing the heat produced during the reaction. The temperature of the reaction could also be controlled to a certain extent by regulating the rate of addition of the chlorine gas. The reaction was performed in a batchwise manner for ethylene and in a continuous manner for acetylene, methyl acetylene, and ethyl acetylene.

Purification of the reaction products was generally carried out in vacuo. The excess carbon disulfide was removed and trapped in a liquid nitrogen condenser. The sulfur containing products are of such a high boiling point that conventional means could not be used for purification by vacuum distillation. It was necessary to use molecular distillation at a high vacuum range of 0.01 to 0.2 microns to effect a separation. The distillation flask was heated to 35–50° C.

The products which are produced by this process may be used in the preparation of rubber accelerators, flotation agents, dye intermediates, pharmaceuticals, lubricant additives, intermediates for agricultural chemicals, and as agents for improving water repellency of cellulosic products.

The following examples illustrate the preparation of the novel compounds of this invention following the general procedures given above.

Example 1

A glass reaction vessel was charged with 3 liters of carbon disulfide. Through inlet ports leading to the bottom of the reaction vessel was introduced ethylene gas and chlorine gas. The reactor used was a gas-lift-siphon type. A cooling finger was introduced into the center tube of the reactor to facilitate temperature control. Since chlorine gas is readily soluble in carbon disulfide, an inert gas, carbon dioxide, was used to lift the reactants in the chlorine inlet arm. A series of 360–B1 fluorescent lamps were placed around each arm of the reactor.

Chlorine gas was introduced at the rate of 400 cc./min. The ethylene was used at a rate of 800 cc./min. which is an excess. The excess was used to help operate the gas-lift siphon. Carbon dioxide which was also used as a lift gas in the chlorine arm, was introduced at the rate of 1100 cc./min. The reaction was conducted for approximately 5 hours. At the end of this time the reactor was emptied and purification and separation begun.

The excess unreacted carbon disulfide (B.P. 46.3° C.) was removed easily in vacuum. The remaining oil was subjected to molecular distillation. Three fractions of sulfur containing product were obtained. This amounted to a total yield of over 50%. Fraction (1) was found to be 2-chloroethyl-thiodichloromethane sulfenyl chloride ($CH_2ClCH_2SCCl_2SCl$); sulfur 25.16%, theory sulfur 25.8%; carbon 14.6%, theory carbon 15.9%. The molecular weight determined by freezing point depression was 247, calculated 246.

Fraction (2) was a mixture approximately 55% ($CH_2ClCH_2SCCl_2SCl$) and 45% ($CH_2ClCH_2S)_2CCl_2$ as determined by molecular weight consideration.

Fraction (3) was found to be bis-(2-chloroethylthio) dichloro methane ($CH_2ClCH_2S)_2CCl_2$; chlorine 51.66%, theory chlorine 51.8%; carbon 21.94%, theory carbon 21.96%. The molecular weight of fraction (3) was 277, the calculated molecular weight 274.

It should be noted that all of these compounds exhibit considerable vesicant activity and care must be used in handling them. Also, these compounds have quite potent and disagreeable odors.

When conducting the reaction of ethylene, carbon disulfide and chlorine, if an excess of ethylene is used an important by-product is the bis-(2-chloroethylthio) dichloromethane. The relative concentration of the bis-thio compound to sulfenyl chloride is proportional to the excess of ethylene. If enough ethylene were used the product could be made to contain essentially all bis-(2-chloroethylthio) dichloromethane.

Example 2

A continuous column reactor was charged with 3.5 liters of carbon disulfide. Gas inlet tubes were provided at the bottom of the column for acetylene and chlorine gas. An inlet was provided at the top of the column for the addition of fresh carbon disulfide.

Chlorine gas was introduced at the rate of 2300 cc./min. and the acetylene was introduced at the rate of 850 cc./min. Fresh carbon disulfide was added at the rate of 2 liters per hour. Liquid overflow was used to remove the products. The reactor was run for approximately 4.5 hours. At the end of this time the reactor was emptied, the excess carbon disulfide was stripped off, and the products placed in the molecular still. By molecular distillation it was possible to separate the two compounds, (1) 2,2,4,5-tetrachloro-1,3-dithiolane, a white crystalline solid, M.P. 45–46° C. crystallized from hexane.

*Analysis.*—Calculated for $C_3H_2Cl_4S_2$: C, 14.75; H, 0.80; Cl, 58.2; S. 26.2. Found: C, 14.67; H, 0.80; Cl, 57.99; S, 26.17. Molecular weight: theory 244, found 247. (2) 1,2,2-trichloroethylthio dichloromethane sulfenyl chloride ($CCl_2HCClHSCCl_2SCl$).

*Analysis.*—Calculated for $C_3H_2Cl_6S_2$: C, 11.4; H, 0.95; Cl, 67.6; S, 20.3. Found: C, 11.44; H, 0.72; Cl, 67.60; S, 20.29. Molecular weight: theory 315, found 315; $n_D^{30}$ 1.5950, $d^{25}$ 1.7220.

An excess of chlorine gas leads to the formation of acetylene tetrachloride, which in turn leads to a larger excess of chlorine. Consequently it is advisable to continually monitor the system in order to obtain the highest yields. With proper control yields of $CS_2$ derivatives can be as high as 98–99%. The ratio of 1,3-dithiolane to sulfenyl chloride was consistently 1 to 4. Although many attempts were made by varying the temperature from −10° C. to +35° C. and varying the chlorine to acetylene ratio, the ratio of 1,3-dithiolane to sulfenyl chloride was not alterable to any extent.

The products from this reaction involving acetylene were unusual in that they were stable at room temperature. All the other thio dichloromethane sulfenyl chlorides decompose gradually at room temperature with the evolution of hydrogen chloride. A tightly stoppered bottle soon become pressurized with hydrogen chloride gas and constitutes a hazard.

Example 3

Using the procedure of the previous example, methyl acetylene was reacted with carbon disulfide and chlorine in the presence of actinic light. The reactor was charged with 3.5 liters of carbon disulfide. Chlorine gas was introduced at the rate of 2620 cc./min. and methyl acetylene was used at the rate of 1230 cc./min. The reactor was kept between 26° C. and 38° C. by cooling. Eight 15 watt 360–B1 ultraviolet lamps were used as actinic light sources. The reaction was run in a continuous manner for 4.5 hours with carbon disulfide added at the rate of 2 liters per hour.

At the end of this time the excess carbon disulfide was removed and a single product (3.5 kg.) was obtained by molecular distillation. The material was found to be 2,2,4,5-tetrachloro-4-methyl-1,3-dithiolane, which has the formula

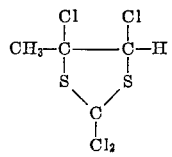

Its identification was confirmed by infrared analysis. The molecular weight as determined in benzene was 262 (theoretical 258).

*Analysis.*—Calculated for $C_4H_4Cl_4S_2$: C, 18.6; H, 1.6; Cl, 55.0; S, 24.8. *Found*: C, 18.6; H, 1.64; Cl, 55.5; S, 24.67. Its density at 24° C. is 1.5666 and refractive index at 30° C. is 1.5772.

It should be noted here that no appreciable amount of corresponding thio-dichloromethane sulfenyl chloride was produced in the reaction of methyl acetylene and carbon disulfide and chlorine gas.

Example 4

Using the procedure of Examples 2 and 3, ethyl acetylene was reacted with carbon disulfide and chlorine in the presence of actinic light. The reactor was charged with 3.5 liters of carbon disulfide. Chlorine gas was introduced at the rate of 2000 cc./min. while ethyl acetylene was used at the rate of 1060 cc./min. The reactor was kept at 20–22° C. by external cooling. The actinic light source was eight 15 watt 360–B1 ultraviolet lamps. The reaction was run in a continuous manner for approximately 4.5 hours.

At the end of this reaction time the excess carbon disulfide was removed in vacuo. The remaining material was purified by molecular distillation and found to be a single component, namely 2,2,4,5-tetrachloro-4-ethyl-1,3-dithiolane which has the formula

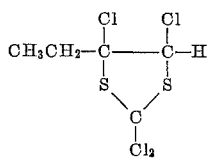

Its identification was confirmed by infrared analysis. The molecular weight as determined in benzene was 271 (theoretical 272).

*Analysis.*—Calculated for $C_5H_6Cl_4S_2$: C, 22.05; H, 2.2; Cl, 52.2; S, 23.5. Found: C, 22.2; H, 2.2; Cl, 52.5; S, 22.7. Its density at 24° C. is 1.5313 and refractive index at 30° C. is 1.5760.

Various changes and modifications may be made in the process described herein as will be apparent to those skilled in the chemical arts. It is accordingly intended that the present invention shall only be limited by the scope of the appended claims.

We claim:

1. A process for producing a new class of sulfur containing compounds of the formula $$R—S—CX_2—S—X$$

wherein X is halogen and R is haloalkyl, comprising reacting unsaturated hydrocarbons selected from the group consisting of alkene and alkyne, a halogen and carbon disulfide in the presence of a free radical initiator.

2. A process for producing a new class of sulfur containing compounds of the formula $$R—S—CCl_2—SCl$$

wherein R is haloalkyl, comprising reacting an unsaturated hydrocarbon selected from the group consisting of alkene and alkyne, chlorine gas and carbon disulfide in the presence of a free radical initiator.

3. A process for producing a new class of sulfur containing compounds of the formula $$R—S—CX_2—S—R'$$

wherein X is halogen, R and R' are haloalkyl, comprising reacting unsaturated alkenes, a halogen and carbon disulfide in the presence of a free radical initiator.

4. A process for producing a new class of sulfur containing compounds of the formula $$R—S—CCl_2—SR'$$

wherein R and R' are haloalkyl, comprising reacting unsaturated alkenes, chlorine gas and carbon disulfide in the presence of a free radical initiator.

5. A process for producing 1,3-dithiolanes represented by the following formula

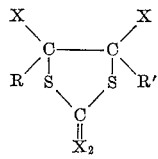

wherein X is halogen, R and R' are selected from the group consisting of hydrogen, alkyl, haloalkyl, aralkyl, and haloaralkyl, comprising reacting an unsaturated alkyne, a halogen and carbon disulfide in the presence of a free radical initiator.

6. A process for producing 1,3-dithiolanes represented by the following formula

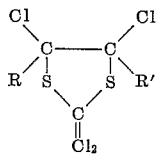

wherein R and R' are selected from the group consisting of hydrogen, alkyl, haloalkyl, aralkyl, haloaralkyl, comprising reacting unsaturated alkynes, chlorine gas and carbon disulfide in the presence of a free radical initiator.

7. The compound, 2 - chloroethylthiodichloromethane sulfenyl chloride.

8. The compound, 1,2,2-trichloroethylthiodichloromethane sulfenyl chloride.

9. 1,3-dithiolanes corresponding to the formula

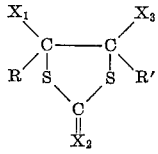

wherein $X_1$, $X_2$ and $X_3$ are halogen, R and R' are selected from the group consisting of hydrogen and lower alkyl.

10. The compound, 2,2,4,5-tetrachloro-1,3-dithiolane.

11. The compound, 2,2,4,5-tetrachloro-4-methyl-1,3-dithiolane.

References Cited by the Examiner
UNITED STATES PATENTS 2,365,561  12/1944  Kharasch _____ 260—609
2,957,001  10/1960  Smith _____ 260—293

WALTER A. MODANCE, *Primary Examiner.*

J. A. PATTEN, *Assistant Examiner.*